United States Patent [19]

Katoh et al.

[11] Patent Number: 5,162,428

[45] Date of Patent: Nov. 10, 1992

[54] PHENOLIC RESIN COMPOSITION

[75] Inventors: Ken Katoh, Fujieda; Keiji Ooi, Shizuoka, both of Japan

[73] Assignee: Sumitomo Bakelite Company Limited, Tokyo, Japan

[21] Appl. No.: 570,445

[22] Filed: Aug. 21, 1990

[30] Foreign Application Priority Data

Jun. 12, 1990 [JP] Japan .................................. 2-151751

[51] Int. Cl.$^5$ ...................... C08L 61/06; C08L 61/10; C08L 61/14
[52] U.S. Cl. .................................. 524/594; 525/501; 525/480; 525/491; 524/593; 524/611
[58] Field of Search ...................... 525/501, 480, 491; 524/593, 594, 611

[56] References Cited

U.S. PATENT DOCUMENTS 3,658,751 4/1972 Grazen et al. ........................ 525/501
4,250,076 2/1981 Golden et al. ........................ 524/541
4,252,700 2/1981 Funabiki et al. ..................... 525/501

FOREIGN PATENT DOCUMENTS 60-35047 2/1985 Japan .

Primary Examiner—James J. Seidleck
Assistant Examiner—W. R. H. Clark
Attorney, Agent, or Firm—Browdy and Neimark

[57] ABSTRACT

A phenolic resin composition comprising (a) 30–55% by weight of an alkylbenzene-modified novolac type phenolic resin, (b) 30–55% by weight of a novolac type phenolic resin and (c) 15–30% by weight of a dimethylene ether resole type phenolic resin, and a phenolic resin molding material comprising said composition.

9 Claims, No Drawings

PHENOLIC RESIN COMPOSITION

FIELD OF THE INVENTION

The present invention relates to a phenolic resin composition capable of providing a phenolic resin molding material of high strength, excellent heat resistance and excellent water resistance. More particularly, the present invention relates to a composition for use in phenolic resin molding material suitable particularly as automobile mechanical parts.

RELATED ART STATEMENT

In recent years, phenolic resin molding materials have been used in several automobile mechanical parts. Since these parts have property requirements such as good dimensional stability, heat resistance, high strength and the like, switch from conventional metallic parts to plastic parts has several problems which have not yet been solved sufficiently.

In plastic parts, dimensional stability can be improved by incorporating an inorganic filler in a large amount, but the amount has a limitation in view of other properties. When the dimensional stability is improved by the use of a phenolic resin, the phenolic resin must have a composition low in volatile content after curing. Improvement is also made by the use of a xylene-modified phenolic resin [e.g., Japanese Patent Application Kokai (Laid-Open) No. 35047/1985], but in this case, strength at high temperatures and water resistance are not sufficient and further improvement in these properties has been desired. Various other investigations have been made in order to improve heat resistance and strength, but balance with other properties is not sufficient. Thus, no satisfactory material has been developed yet.

OBJECT AND SUMMARY OF THE INVENTION

The present invention is intended to provide a phenolic resin molding material having excellent dimensional stability, good heat resistance, good water resistance and high strength, which is suitably used in molding of automobile mechanical parts.

The present invention provides a phenolic resin molding composition comprising (a) 30-55% by weight of an alkylbenzene-modified novolac type phenolic resin, (b) 30-55% by weight of a novolac type phenolic resin not alkylbenzene modified, and (c) 15-30% by weight of a dimethylene ether resole type phenolic resin. In this composition, the individual resins preferably are (a) an alkylbenzene-modified novolac type phenolic resin having a number-average molecular weight of 400-600 wherein the proportion of modification by alkylbenzene is 30-60 mole %, (b) an unmodified novolac type phenolic resin having a number-average molecular weight of 600-800 wherein the ortho/para ratio (o/p ratio) is 0.6-0.8, and (c) a dimethylene ether resole type phenolic resin having a number-average molecular weight of 650-800 wherein the proportion of dimethylene ether form in total formaldehyde bonded is 40 mole % or more. The present invention further provides a phenolic resin molding material comprising 25-35% by weight of the above-mentioned phenolic resin composition and 40% by weight or more of a glass fiber as a reinforcing agent.

DETAILED DESCRIPTION OF THE INVENTION

Alkylbenzene-modified novolac type phenolic resins, as compared with unmodified novolac type phenolic resins, are inferior in curability and accordingly low in crosslinking density when cured, and therefore they have a problem when used alone as a molding material. Further, even the combined use of an alkylbenzene-modified novolac type phenolic resin and an unmodified novolac type phenolic resin has been insufficient. The present inventors made extensive study in order to eliminate the above problems. As a result, desired properties have been obtained by formulating a resin composition using the above three components in the above proportions.

The alkylbenzene-modified novolac type phenolic resin is usually obtained as follows. An alkylbenzene such as xylene, mesitylene or the like is reacted with formaldehyde in the presence of a strong acid such as sulfuric acid or the like to obtain an alkylbenzene-formaldehyde condensation product, then, the condensation product is reacted with a novolac type phenolic resin or phenol; as necessary, formaldehyde is added and a further reaction is effected. After the completion of the reaction, neutralization is effected, and water and the unreacted materials are removed to obtain a final product.

In the present invention, the proportion of modification by alkylbenzene in the alkylbenzene-modified novolac type phenolic resin is preferably 30-60 mole %. When the proportion of modification is less than 30 mole %, the resulting composition has low water resistance. When the proportion is more than 60 mole %, the composition has low curability. The number-average molecular weight of the alkylbenzene-modified novolac type phenolic resin is preferably 400-600. When the number-average molecular weight is larger than 600, the resulting composition gives low fluidity in molding a molding material made from the composition. When the molecular weight is smaller than 400, the resulting composition contains low-molecular components in large amounts, making the handling difficult and giving a molded article of low strength.

The novolac type phenolic resin can be obtained usually by reacting phenol with formaldehyde in the presence of an acid catalyst such as oxalic acid, hydrochloric acid or the like. The o/p ratio of the novolac type phenolic resin is preferably 0.6-0.8 in view of the curability and strength of the resulting composition. The number-average molecular weight of the novolac type phenolic resin is preferably 600-800. When the molecular weight is larger than 800, the resulting composition gives low fluidity in molding a molding material made from the composition. When the molecular weight is smaller than 600, the composition contains low-molecular components in large amounts, giving low curability and low strength.

The dimethylene ether resole type phenolic resin can be obtained by reacting phenol with formaldehyde using, as a catalyst, a bi-valent metal salt such as zinc acetate or the like. In this phenolic resin, the proportion of dimethylene ether form in total formaldehyde bonded to phenol nucleus is usually 30 mole % or more. The proportion of dimethylene ether form is preferably 40 mole % or more. When the proportion of dimethylene ether form is less than 40 mole %, the resulting composition gives low fluidity in molding a molding material made from the composition. The number-average molecular weight of the dimethylene ether resole type phenolic resin is preferably 650–800. A dimethylene ether resole type phenolic resin having a number-average molecular weight of less than 650 contains low-molecular components in large amounts, making poor the kneading operation when made into a molding material and, in some cases, inviting lumping of resins. A dimethylene ether resole type phenolic resin having a number-average molecular weight of more than 800 gives low fluidity in molding a molding material made from the composition.

The properties mentioned above for the individual resins were measured by the following analytical methods.

I. Proportion of Modification by alkylbenzene

Measured by calculating the proportion of a particular peak in NMR spectrum.

II. Ortho/para ratio (o/p ratio)

Measured by calculating the ratio of particular peaks in NMR spectrum.

III. Number-average molecular weight

Measured by high-performance liquid chromatography.

IV. Proportion of dimethylene ether form

Measured by calculating the proportion of a particular peak in NMR spectrum.

When the above-mentioned phenolic resin composition is made into a molding material, there is added to the composition 5–25% by weight, based on the total resin, of hexamethylenetetramine as a crosslinking agent. When the amount of hexamethylenetetramine is more than 25% by weight, the resulting molding material gives too high a crosslinking density and a high volatile content when molded. When the amount is less than 5% by weight, the molding material is not cured sufficiently, giving a molded article inferior in properties, particularly chemical resistance.

To the phenolic resin composition of the present invention there can be further added an organic or inorganic filler, a releasing agent, a coloring agent, etc. The filler is preferably an inorganic fibrous filler, for example, a glass fiber in order for the resulting molding material to show high strength, excellent heat resistance and excellent water resistance as intended by the present invention. As the glass fiber, there can be used commercially available ordinary glass chopped strands of 1–6 mm in fiber length and 3–13 μm in fiber diameter.

In order to increase the interfacial adhesion between the resins and the filler, there can be used a silane coupling agent such as aminosilane, epoxysilane or the like. The use is beneficial to the further enhancement of water resistance and strength.

In producing a molding material from the phenolic resin composition of the present invention, the above-mentioned raw materials are mixed uniformly; the mixture is heat-kneaded by a kneader (e.g., rolls, co-kneader, twin-screw extruder) or a combination of rolls and an other kneader; and the kneaded product is ground to obtain a molding material. It is possible that a pelletizer be further used to obtain a molding material in the form of pellets.

The phenolic resin composition and the molding material obtained therefrom, according to the present invention, are excellent in dimensional stability, heat resistance, water resistance and strength, and accordingly can be applied to automobile mechanical parts as used under circumstances wherein influences by gasoline, alcohol, water, temperature and the like must be considered.

DESCRIPTION OF PREFERRED EMBODIMENTS

The present invention is described in detail below by way of Examples.

EXAMPLE 1

There were uniformly mixed (a) 12% by weight of a xylene-modified novolac type phenolic resin having a number-average molecular weight of 530 wherein the proportion of modification by xylene was 40 mole %, (b) 12% by weight of a novolac type phenolic resin having a number-average molecular weight of 680 wherein the o/p ratio was 0.72 and which was obtained by reacting formaldehyde with phenol (the feed ratio of the former to the latter was 0.85 by mole) in the presence of a hydrochloric acid catalyst, (c) 6% by weight of a dimethylene ether resole type phenolic resin having a number-average molecular weight of 700 wherein the proportion of dimethylene ether form was 50 mole % and which was obtained by reacting formaldehyde with phenol (the feed ratio of the former to the latter was 1.6 by mole) in the presence of a catalyst, zinc acetate, (d) 5% by weight of hexamethylenetetramine, (e) 50% by weight of glass chopped strands (ECS015B154H manufactured by Nihon Denki Glass K. K.), (f) 10% by weight of spherical silica of 10 μm in average particle diameter and (g) 5% by weight of a silane coupling agent, a releasing agent, a coloring agent, etc. The mixture was kneaded by rolls of 100° C. for 5 minutes. After cooling, the kneaded product was ground to obtain a molding material.

EXAMPLE 2

There were uniformly mixed (a) 15% by weight of a xylene-modified novolac type phenolic resin having a number-average molecular weight of 600 wherein the proportion of modification by xylene was 35 mole %, (b) 10% by weight of a novolac type phenolic resin having a number-average molecular weight of 760 wherein the o/p ratio was 0.70 and which was obtained by reacting formaldehyde with phenol (the feed ratio of the former to the latter was 0.87 by mole) in the presence of a catalyst, oxalic acid, (c) 4% by weight of a dimethylene ether resole type phenolic resin having a number-average molecular weight of 650 wherein the proportion of dimethylene ether form was 44 mole % and which was obtained by reacting formaldehyde with phenol (the feed ratio of the former to the latter was 1.4 by mole) in the presence of a catalyst, manganese acetate, (d) 4% by weight of hexamethylenetetramine, (e) 45% by weight of glass chopped strands (RES03-BM38 manufactured by Nihon Glass Fiber K. K.), (f) 15% by weight of a silica powder of 5 μm in average particle diameter, (g) 2% by weight of a pulp and (h) 5% by weight of a silane coupling agent, a releasing agent, a coloring agent, etc. The mixture was kneaded by a twin-screw extruder and pelletized by a pelletizer to obtain a molding material.

EXAMPLE 3

There were uniformly mixed (a) 10% by weight of a mesitylene-modified novolac type phenolic resin having a number-average molecular weight of 550 wherein the proportion of modification by mesitylene was 40 mole %, (b) 15% by weight of a novolac type phenolic resin having a number-average molecular weight of 600 wherein the o/p ratio was 0.60 and which was obtained by reacting formaldehyde with phenol (the feed ratio of the former to the latter was 0.85 by mole) in the presence of a catalyst, sulfamic acid, (c) 5% by weight of a dimethylene ether resole type phenolic resin having a number-average molecular weight of 700 wherein the proportion of dimethylene ether form was 50 mole % and which was obtained by reacting formaldehyde with phenol (the feed ratio of the former to the latter was 1.6 by mole) in the presence of a catalyst, zinc acetate, (d) 4% by weight of hexamethylenetetramine, (e) 61% by weight of glass chopped strands (ECS015B154H manufactured by Nihon Denki Glass K. K.) and (f) 5% by weight of a silane coupling agent, a releasing agent, a coloring agent, etc. The mixture was kneaded by rolls of 100° C. for 5 minutes. After cooling, the kneaded product was ground to obtain a molding material.

COMPARATIVE EXAMPLE 1

There were uniformly mixed 30% by weight of a novolac type phenolic resin having a number-average molecular weight of 680 wherein the o/p ratio was 0.72 and which was obtained by reacting formaldehyde with phenol (the feed ratio of the former to the latter was 0.85 by mole) in the presence of a catalyst, hydrochloric acid, 5% by weight of hexamethylenetetramine, 50% by weight of glass chopped strands (ECS015B154H manufactured by Nihon Denki Glass K. K.), 10% by weight of a silica powder of 5 μm in average particle diameter and 5% by weight of a silane coupling agent, a releasing agent, a coloring agent, etc. The mixture was kneaded by rolls of 100° C. for 5 minutes. After cooling, the kneaded product was ground to obtain a molding material.

COMPARATIVE EXAMPLE 2

There were uniformly mixed 15% by weight of the xylene-modified novolac type phenolic resin used in Example 1, 15% by weight of a novolac type phenolic resin having a number-average molecular weight of 680 wherein the o/p ratio was 0.72 and which was obtained by reacting formaldehyde with phenol (the feed ratio of the former to the latter was 0.85 by mole) in the presence of a catalyst, hydrochloric acid, 5% by weight of hexamethylenetetramine, 60% by weight of glass chopped strands (ECS015B154H manufactured by Nihon Denki Glass K. K.) and 5% by weight of a silane coupling agent, a releasing agent, a coloring agent, etc. The mixture was kneaded by rolls of 100° C. for 5 minutes. After cooling the kneaded product was ground to obtain a molding material.

The properties of the molding materials obtained in the Examples and the Comparative Examples are shown in Table 1.

TABLE 1

|  | Example 1 | Example 2 | Example 3 | Comparative Example 1 | Comparative Example 2 |
|---|---|---|---|---|---|
| (1) Degree of dimensional change to water (degree of dimensional change when subjected to saturated water absorption at 130° C.) (%) | 0.19 | 0.22 | 0.20 | 0.45 | 0.47 |
| (2) Degree of dimensional change when heated (180° C. × 1,000 hrs) (%) | 0.28 | 0.30 | 0.26 | 0.31 | 0.40 |
| (3) Linear expansion coefficient (25° C.–200° C.) ($\times 10^{-5}$/°C.) | 2.1 | 2.0 | 1.9 | 2.3 | 2.6 |
| (4) Flexural strength (120° C.) (kg/mm$^2$) | 18.0 | 17.5 | 18.5 | 16.0 | 14.0 |
| (5) Heat deformation temperature (°C.) | 230 | 235 | 225 | 210 | 190 |
| (6) Curability (cured at 180° C. for 20 seconds) (Barcol hardness No. 935) | 70 | 72 | 69 | 73 | 45 |

(1) Degree of dimensional change to water: A test piece of 127 mm × 12.7 mm × 0.5 mm was molded at 175° C. for 3 minutes, then subjected to after-curing at 180° C. for 3 hours. The resulting test piece was placed in saturated steam of 130° C. to measure the degree of dimensional change when subjected to saturated water absorption at 130° C.
(2) Degree of dimensional change when heated: A test piece molded at 175° C. for 3 minutes to measure a molding shrinkage factor specified in JIS K 6911 was subjected to after-curing at 180° C. for 3 hours. The dimension of this molding was taken as 0 (zero).
(4) Flexural strength and (5) heat deformation temperature: Measured by JIS K 6911 (molded at 175° C. for 3 minutes).

As clear from the above Examples and Comparative Examples, the phenolic resin composition and molding material of the present invention are excellent in dimensional stability, water resistance and strength. Having high heat resistance, they are particularly excellent in dimensional stability, water resistance and strength at high temperatures. Accordingly, they are suited for use in molded articles wherein said properties are required, particularly in automobile mechanical parts.

What is claimed is:

1. A phenolic resin molding composition comprising (a) 30–55% by weight of an alkylbenzene-modified novolac type phenolic resin, (b) 30–55% by weight of an unmodified novolac type phenolic resin, and (c) 15–30% by weight of a dimethylene ether resole type phenolic resin.

2. A phenolic resin molding composition according to claim 1, wherein the individual resins are (a) an alkylbenzene-modified novolac type phenolic resin having a number-average molecular weight of 400–600 wherein the proportion of modification by alkylbenzene is 30–60 mole %, (b) an unmodified novolac type phenolic resin having a number-average molecular weight of 600–800 wherein the ortho/para ratio is 0.6–0.8, and (c) a dimethylene ether resole type phenolic resin having a number-average molecular weight of 650–800 wherein the proportion of dimethylene ether form in total formaldehyde bonded is 40 mole % or more.

3. A phenolic resin molding composition comprising 25–35% by weight of a phenolic resin composition according to claim 1 and 40% by weight or more of a glass fiber as a reinforcing agent.

4. A composition according to claim 1 wherein the alkylbenzene is xylene or mesitylene.

5. A composition according to claim 2 wherein the alkylbenzene is xylene or mesitylene.

6. A molding composition according to claim 3, further comprising 5-25% by weight, based on the resins, of hexamethylenetetramine.

7. A molding composition according to claim 3, wherein the glass fiber consists of glass chopped strands having fiber lengths of 1-6 mm and fiber diameters of 3-13 μm.

8. A molding composition according to claim 3, further comprising a silane coupling agent.

9. A molding composition according to claim 8, wherein the silane coupling agent is chosen from the group consisting of aminosilane and epoxysilane.

* * * * *